United States Patent
Diehl et al.

(10) Patent No.: US 7,312,012 B1
(45) Date of Patent: Dec. 25, 2007

(54) UREA STABILIZERS FOR THERMAL DYE TRANSFER MATERIALS

(75) Inventors: Donald R. Diehl, Rochester, NY (US); Shari L. Eiff, Rush, NY (US); Ramanuj Goswami, Webster, NY (US); Christine J. Landry-Coltrain, Fairport, NY (US); Gary M. Russo, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 11/610,582

(22) Filed: Dec. 14, 2006

(51) Int. Cl.
*G03F 7/34* (2006.01)
*G03C 8/10* (2006.01)
*C09B 67/00* (2006.01)
*B41M 5/20* (2006.01)

(52) U.S. Cl. .................. 430/200; 430/201; 430/216; 8/471; 8/585; 428/32.6; 428/32.76; 503/227

(58) Field of Classification Search .............. 430/200, 430/201, 216; 503/227; 8/471, 585; 428/32.6, 428/32.76
See application file for complete search history.

(56) References Cited

U.S. PATENT DOCUMENTS

| | | | |
|---|---|---|---|
| 4,621,271 A | | 11/1986 | Brownstein |
| 4,705,522 A | | 11/1987 | Byers |
| 4,855,281 A | | 8/1989 | Byers |
| 5,073,533 A | * | 12/1991 | Aono .................. 503/227 |
| 5,212,146 A | * | 5/1993 | Komamura et al. ........ 503/227 |
| 5,288,691 A | | 2/1994 | Vanier et al. |
| 5,342,728 A | | 8/1994 | Henzel |
| 5,358,922 A | * | 10/1994 | Nakayama et al. ......... 503/227 |
| 5,426,022 A | | 6/1995 | Hagemann |
| 5,618,773 A | | 4/1997 | Bailey et al. |
| 5,620,941 A | | 4/1997 | Van Hanehem et al. |
| 5,627,129 A | | 5/1997 | Kung et al. |

2005/0233902 A1  10/2005  Mizukami

FOREIGN PATENT DOCUMENTS

JP  62-178962  8/1987
JP  2005-092035  4/2005

OTHER PUBLICATIONS

Japanese Abstract 62-178962, 1987.

\* cited by examiner

*Primary Examiner*—Richard L. Schilling
(74) *Attorney, Agent, or Firm*—Lynne M. Blank

(57) ABSTRACT

The present invention relates to a thermal donor comprising a dye mixture and a urea light-stabilizing compound, wherein the light-stabilizing compound is represented by structure I:

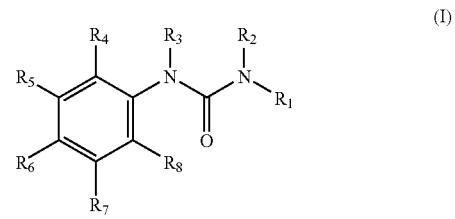

(I)

wherein:
$R_1$, $R_2$ and $R_3$ represent a hydrogen atom, alkyl group, cycloalkyl group, alkenyl group, aralkyl group, aryl group or heterocyclic group, provided that at least one of $R_1$, $R_2$, and/or $R_3$ is a hydrogen atom; $R_4$-$R_8$ represent a hydrogen atom, hydroxyl group, alkyl group, cycloalkyl group, alkenyl group, aralkyl group, aryl group, heterocyclic group, aryloxy group, or alkoxy group; and $R_3$ forms a heterocyclic ring with either $R_4$ or $R_8$, and an imaging system comprising a donor sheet having a layer containing a dye and an image receiving sheet having a dye receiving layer, wherein either the donor sheet or the image receiving sheet comprises a dye mixture and a urea light-stabilizing compound of structure I.

30 Claims, No Drawings

UREA STABILIZERS FOR THERMAL DYE TRANSFER MATERIALS

FIELD OF THE INVENTION

The present invention relates to dye thermal systems used to prepare prints from electronic images, and more particularly to the use of a particular urea stabilizer compound.

BACKGROUND OF THE INVENTION

Thermal dye diffusion or sublimation transfer systems have been developed to obtain prints from pictures that have been generated electronically, for example, from a color video camera or digital camera. Details of this process and apparatus for practicing it are contained in U.S. Pat. No. 4,621,271 to Brownstein.

Thermal transfer works by transmitting heat through a donor from the backside to a dye-donor layer on the opposite side. When the dyes in the dye-donor layer are heated sufficiently, they sublime or diffuse, transferring to an adjacent receiving layer of the receiver element.

All imaging dyes are unstable to light to a greater or lesser degree. Dyes are known to photolytically degrade via a number of paths which often involve dye triplet states, radicals and/or singlet oxygen. The light degradation is further known to occur to different degrees depending upon the color of the dyes, i.e.: yellow, magenta, cyan, or mixtures thereof. Multiple dye light stabilizing compounds may be required to significantly improve overall thermal transfer image stability. Each individual dye light stabilizing compound may provide a small improvement which adds to the overall stabilization by a chosen set of materials. Thus, for any given stabilizing compound any demonstrated improvement in light stability is highly desirable.

Combinations of dyes and stabilizing compounds can result in different light fastnesses. For example, even if enhanced light fastness of a magenta dye is achieved, that of a cyan dye may not be achieved, resulting in poor color balance of images. In a thermal transfer recording material having formed images, dyes forming yellow, magenta and cyan images exist in an identical layer, in which a dye exhibiting poorest light fastness is affected by the other dyes, resulting in a hue shift in color mixing in the neutral or gray images leading to apparently deteriorated images.

The stabilizing compound may be incorporated into the dye layer of a donor element, it may be incorporated into a separate donor element, it may be incorporated into a separate portion of a donor element with repeating areas of dyes, or it may be incorporated into the dye receiving element. Incorporation of individual stabilizing compounds has been described in the prior patent literature most notably: U.S. Pat. Nos. 4,705,522, 4,855,281, 5,288,691, 5,342,728, 5,618,773, 5,620,941, 5,627,129, and recently, U.S. Patent Application Publication 2005/0233902. The materials described in these publications include, for example, phenols, epoxy compounds, alkoxy aryl compounds, dialkoxy aryl compounds, trialkoxy aryl compounds, alkyl or cycloalkyl substituted alkoxy aryl compounds, sulfonamido substituted aryl compounds, and hindered amine light stabilizing compounds.

U.S. Pat. Publication No. 2005/0233902 discloses a thermal transfer recording material, comprising an ink sheet having an ink layer containing a dye and an image receiving sheet having a dye receiving layer, wherein the ink sheet or the image receiving sheet contains an antioxidant exhibiting an oxidation potential of not less then 1000 mV (vs. SCE). However, the publication does not mention the specific set of stabilizing compounds of the present invention.

U.S. Pat. No. 5,426,022 discloses a photographic recording material with at least one silver halide emulsion layer, that contains novel light stabilizers for the azomethine dyes produced during chromogenic development. JP2005092035A2 (Fuji) discloses a color fade preventing agent for use in silver halide color photographic paper to provide good image stability. JP62178962 (Konishiroku Photo Industry Co. Ltd.) discloses phenylenediamine derivative-type dye image stabilizers for use in silver halide color photographic materials to give dye images with improved lightfastness and few stains. However, these references fail to disclose the specific compounds containing alkoxy groups and a urea group for use in thermal dye transfer materials required to stabilize thermal dye transfer images.

PROBLEM TO BE SOLVED

There is still a need for further thermal dye transfer stabilizing compounds to be used either individually, or as an element of a set of stabilizing compounds, especially with regard to the light stability of dye diffusion thermal transfer dyes.

SUMMARY OF THE INVENTION

The present invention relates to a thermal donor comprising a dye mixture and a urea light-stabilizing compound for stabilizing at least one dye, wherein the urea light-stabilizing compound is represented by the following structure I:

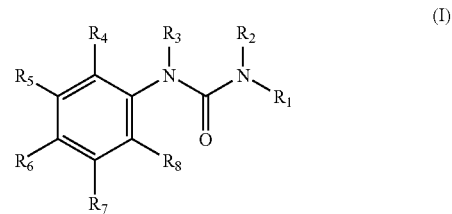

wherein:

$R_1$, $R_2$ and $R_3$ independently represent a hydrogen atom, alkyl group, cycloalkyl group, alkenyl group, aralkyl group, aryl group or heterocyclic group, provided that at least one of $R_1$, $R_2$, and/or $R_3$ is a hydrogen atom;

$R_4$-$R_8$ independently represent a hydrogen atom, hydroxyl group, alkyl group, cycloalkyl group, alkenyl group, aralkyl group, aryl group, heterocyclic group, aryloxy group, or alkoxy group; and $R_3$ forms a heterocyclic ring with either $R_4$ or $R_8$, and an imaging system comprising a donor sheet having a layer containing a dye on a support and an image receiving sheet having a dye receiving layer on a substrate, wherein at least one of the donor sheet or the image receiving sheet comprises a dye mixture and a urea light-stabilizing compound for stabilizing at least one dye, wherein the urea light-stabilizing compound is represented by the following structure I:

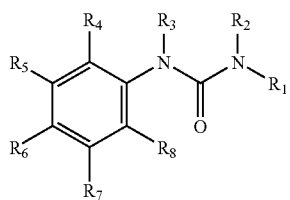

(I)

wherein:

$R_1$, $R_2$ and $R_3$ independently represent a hydrogen atom, alkyl group, cycloalkyl group, alkenyl group, aralkyl group, aryl group or heterocyclic group, provided that at least one of $R_1$, $R_2$, and/or $R_3$ is a hydrogen atom;

$R_4$-$R_8$ independently represent a hydrogen atom, hydroxyl group, alkyl group, cycloalkyl group, alkenyl group, aralkyl group, aryl group, heterocyclic group, aryloxy group, or alkoxy group;

$R_3$ forms a heterocyclic ring with either $R_4$ or $R_8$; and wherein said imaging system is a dye thermal system used to prepare prints from electronic images.

ADVANTAGEOUS EFFECT OF THE INVENTION

The present invention includes several advantages, not all of which are incorporated in a single embodiment. The urea stabilizing compounds of the present invention may provide improved light fade stability, improved keeping properties, or higher efficiency, providing high quality images of sufficient density and improved light fastness, even at line speed printing of equal to or less than one milliseconds.

DETAILED DESCRIPTION OF THE INVENTION

The present invention relates to a urea stabilizing compound, a thermal donor including a stabilizing compound and a dye mixture, as well as a method of forming thermal prints using the donor, wherein the urea stabilizing compound comprises a material of the following structure I:

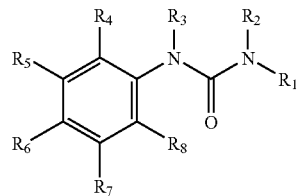

(I)

Wherein $R_1$, $R_2$ and $R_3$ may be the same or different and independently represent a hydrogen atom, alkyl group, cycloalkyl group, alkenyl group, aralkyl group, aryl group or heterocyclic group provided that at least one of $R_1$, $R_2$, and/or $R_3$ is a hydrogen atom; $R_4$-$R_8$ may be the same or different and may each independently represent a hydrogen atom, hydroxyl group, alkyl group, cycloalkyl group, alkenyl group, aralkyl group, aryl group, heterocyclic group, aryloxy group, or alkoxy group and that two adjacent $R_4$-$R_8$ groups may be joined together to form a carbocyclic or heterocyclic ring, and $R_3$ may form a heterocyclic ring with either $R_4$ or $R_8$.

A stabilizing compound and dye composition as described herein can exhibit one or more of improved light fade stability, higher efficiency, providing high quality images of sufficient density and improved lightfastness even at line speed printing of equal to or less than one milliseconds.

The compounds of the present invention contain alkoxy groups and a urea group which has not been disclosed in the prior published patent literature relating to thermal dye diffusion or sublimation transfer materials. Such compounds will be demonstrated by comparative tests hereinafter to be very effective stabilizers for thermal dye transfer images.

Specific stabilizing compounds included within the scope of this invention are as follows:

TABLE 1

| Invention | Structure<br>Molecular Weight,<br>Calculated Log Partition Coefficient | Melting point ° C. | Purified Yield |
|---|---|---|---|
| SE-1 | ![structure] MW 448 cLogP9.68 | 122-122.5 | 61% |

TABLE 1-continued
| Invention | Structure Molecular Weight, Calculated Log Partition Coefficient | Melting point ° C. | Purified Yield |
|---|---|---|---|
| SE-2 | 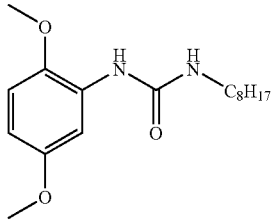 MW 308 cLogP4.77 | 119 | 55% |
| SE-3 | 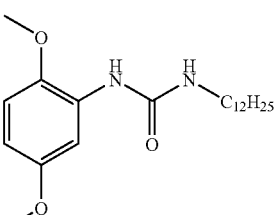 MW 364 cLogP6.73 | 121 | 88% |
| SE-4 | 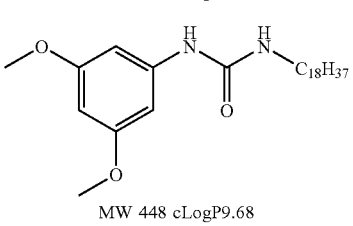 MW 448 cLogP9.68 | 99-100 | 89% |
| SE-5 | 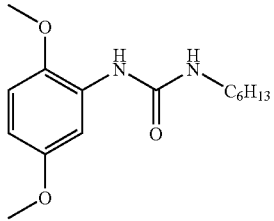 MW 280 cLogP3.79 | 115-116 | 83% |
| SE-6 | 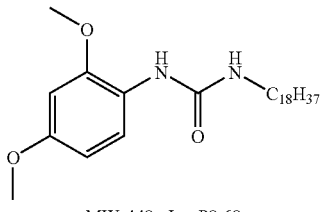 MW 448 cLogP9.68 | 115-116 | 50% |
| SE-7 | 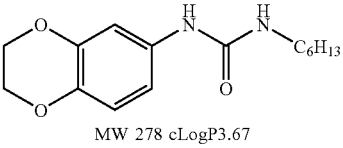 MW 278 cLogP3.67 | 116-117 | 33% |
| SE-8 | 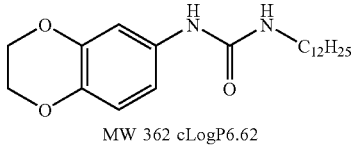 MW 362 cLogP6.62 | 108-109 | 69% |

TABLE 1-continued

| Invention | Structure Molecular Weight, Calculated Log Partition Coefficient | Melting point ° C. | Purified Yield |
|---|---|---|---|
| SE-9 | 3,5-dimethoxyphenyl-NH-C(O)-NH-C₁₂H₂₅<br>MW 364 cLogP6.73 | 93-94 | 89% |
| SE-10 | 2,4-dimethoxyphenyl-NH-C(O)-NH-C₁₂H₂₅<br>MW 364 cLogP6.73 | 110-111 | 72% |
| SE-11 | 3,4-dimethoxyphenyl-NH-C(O)-NH-C₁₂H₂₅<br>MW 364 cLogP6.22 | 99-100 | 95% |
| SE-12 | 2,5-diethoxyphenyl-NH-C(O)-NH-C₁₂H₂₅<br>MW 392 cLogP7.72 | 95 | 45% |
| SE-13 | 2,5-diethoxyphenyl-NH-C(O)-NH-C₈H₁₇<br>MW 336 cLogP5.75 | 97 | 51% |
| SE-14 | C₆H₁₃-NH-C(O)-NH-(2,5-bis(dodecyloxy)phenyl)<br>MW 588 cLogP14.6 | 72-73 | 78% |

TABLE 1-continued

| Invention | Structure Molecular Weight, Calculated Log Partition Coefficient | Melting point ° C. | Purified Yield |
|---|---|---|---|
| SE-15 | 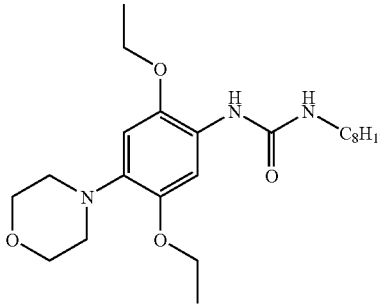<br>MW 421 cLogP5.54 | 155-156 | 78% |
| SE-16 | 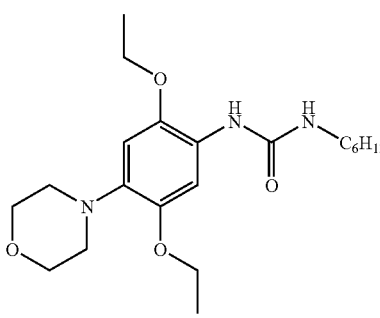<br>MW 393 cLogP4.56 | 139-140 | 62% |

The stabilizing compounds of this invention may be prepared by methods known to those skilled in the art including the reaction of arylamines with isocyanates as shown below.

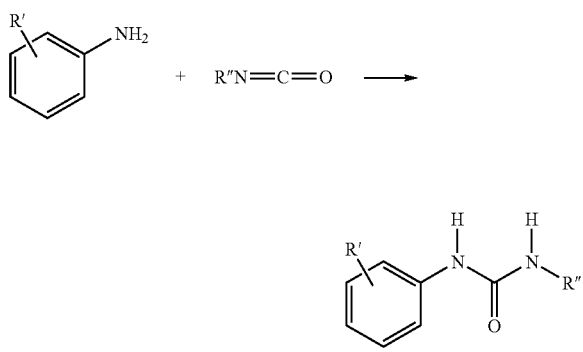

Further methods are provided in the experimental Examples to further illustrate the invention.

The stabilizing compound may be incorporated into the dye layer of a donor element, for example, in the yellow donor area, the magenta donor area, the cyan donor area, or the laminate donor area. The stabilizing compound may be incorporated into a separate donor element, it may be incorporated into a separate portion of a donor element with repeating areas of dyes, or it may be incorporated into the dye receiving element. Although the urea dye light stabilizing compound may be used in any dye-donor layer, the most preferable location is in the dye-donor magenta patch. The stabilizing compounds of the invention may be present in any concentration which is effective for the intended purpose. Generally, good results have been obtained at about 0.02 to about 0.5 grams/m$^2$ of the dye-donor or stabilizer-donor element, in particular molar concentrations of 10% to 90%, more particularly 30% to 80%, of the stabilizing compound relative to the total dye molar concentration have been found to be preferred.

The urea stabilizer may be characterized by various physical properties, including, for example, oxidation potential. The oxidation potential is commonly known in the art and detailed in, for example, "Encyclopedia of Electrochemistry of the Elements; Organic Section, vol. XI to XV; edited by A. Bard and H. Lund, Marcel Dekkar Inc., New York (1984). The preferred oxidation potential exhibited by the present urea stabilizer compounds is less than 1V. The urea stabilizer can have high solubility in solvents other than water. It is especially preferred that the stabilizer have a high solubility in toluene.

Any dye transferable by heat can be used in the dye-donor layer of the dye-donor element. The dye can be selected by taking into consideration hue, lightfastness, and solubility of the dye in the dye donor layer binder and the dye image receiving layer binder.

Yellow Dye Set 1
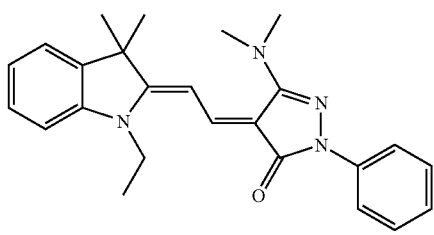
Y-1
CAS RN 116423-45-1
MW = 400.52
λ max 459 nm
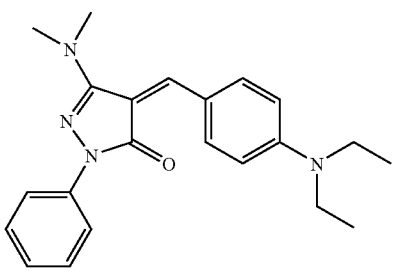
Y-2
CAS RN 125888-49-5
MW 362.47
λ max 447 nm
Magenta Dye Set 1
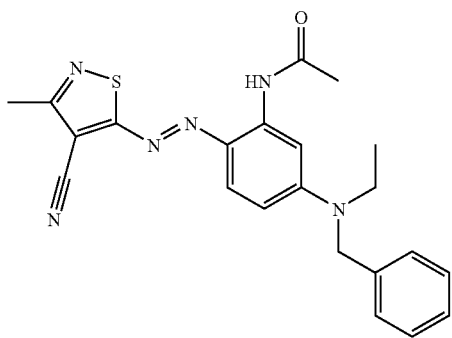
M-1
CAS RN 112940-69-9
MW 418.52
λ max 544 nm
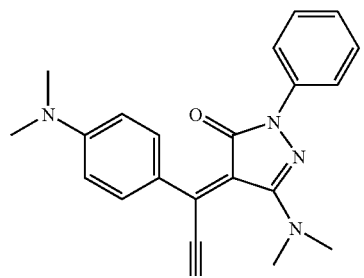
M-2
CAS RN 124621-37-0
MW 359.43
λ max 522 nm
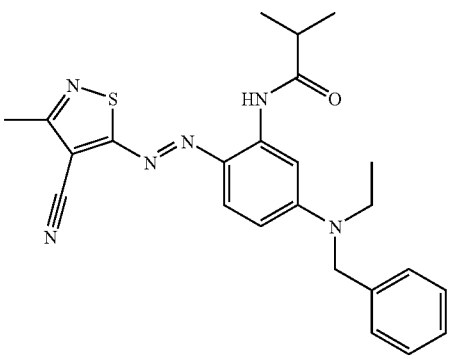
M-3
CAS RN 186030-51-3
MW 446.57
λ max 544 nm
Cyan Dye Set 1
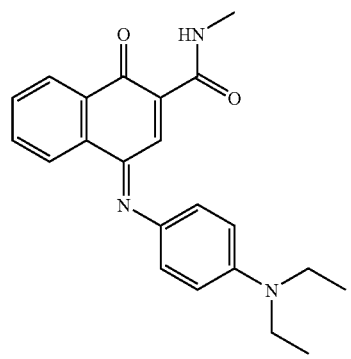
C-1
CAS RN 4899-82-5
MW 361.44
λ max 658 nm
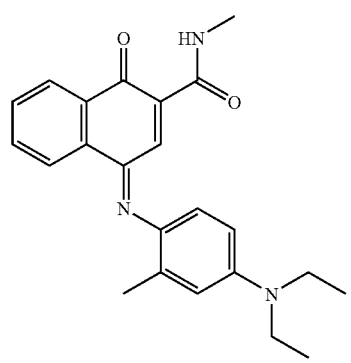
C-2
CAS RN 102187-53-1
MW 375.47
λ max 677 nm

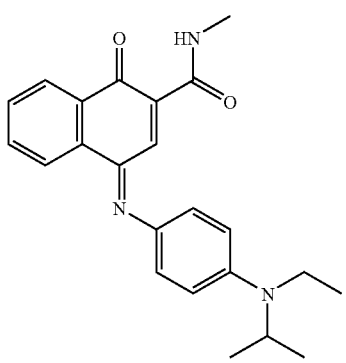

C-3
CAS RN 161358-44-7
MW 375.47
λ max 657 nm

Magenta Dye Set 2

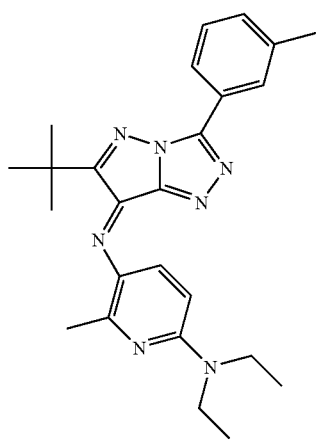

M-4
CAS RN 162208-01-7
MW = 429
λ max 535 nm

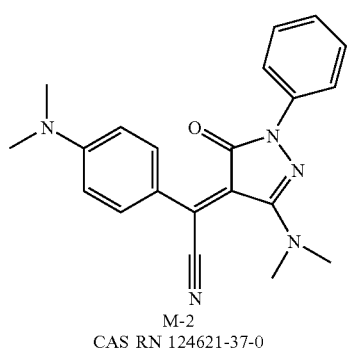

M-2
CAS RN 124621-37-0
MW 359.43
λ max 522 nm

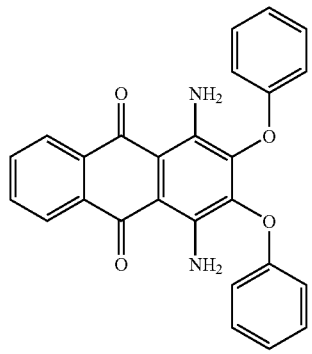

M-5
CAS RN 6408-72-6
MW 422
λ max 544 nm

Cyan Dye Set 2

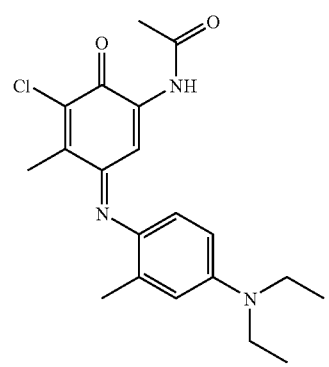

C-4
CAS RN 102387-48-1
λ max 669 nm

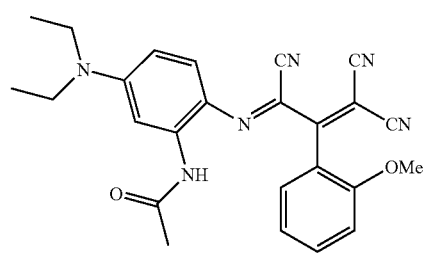

C-5
MW 440.50
λ max 628 nm

The dyes can be employed singly or in combination to obtain, for example, a monochrome dye-donor layer or a black dye-donor layer. The dyes can be used in an amount of from 0.05 g/m$^2$ to 1 g/m$^2$ of coverage. According to various embodiments, the dyes can be hydrophobic.

Examples of sublimable or diffusible dyes include anthraquinone dyes, e.g., Sumikalon Violet RS® (Sumitomo Chemical Co., Ltd.), Dianix Fast Violet 3R FS® (Mitsubishi Chemical Industries, Ltd.), and Kayalon Polyol Brilliant Blue N BGM® and KST Black 146® (Nippon Kayaku Co., Ltd.); azo dyes such as Kayalon Polyol Brilliant Blue BM®, Kayalon Polyol Dark Blue 2BM®, and KST Black KR® (Nippon Kayaku Co., Ltd.), Sumickaron Diazo Black 5G® (Sumitomo Chemical Co., Ltd.), and Miktazol Black 5 GH® (Mitsui Toatsu Chemicals, Inc.); direct dyes such as Direct Dark Green B® (Mitsubishi Chemical Industries, Ltd.) and Direct Brown M® and Direct Fast Black D™ (Nippon Kayaku Co. Ltd.); acid dyes such as Kayanol Milling Cyanine 5R® (Nippon Kayaku Co. Ltd.); basic dyes such as Sumicacryl Blue 6G® (Sumitomo Chemical Co., Ltd.), and Aizen Malachite Green® (Hodogaya Chemical Co., Ltd.); or any of the dyes disclosed in U.S. Pat. No. 4,541,830, the disclosure of which is hereby incorporated by reference.

Examples of further suitable dyes, including further magenta, yellow, and cyan dyes, can include, but are not limited to, diarylmethane dyes; triarylmethane dyes; thiazole dyes, such as 5-arylisothiazole azo dyes; methine dyes such as merocyanine dyes, for example, aminopyrazolone merocyanine dyes; azomethine dyes such as indoaniline, acetophenoneazomethine, pyrazoloazomethine, imidazoleazomethine, imidazoazomethine, pyridoneazomethine, and tricyanopropene azomethine dyes; xanthene dyes; oxazine dyes; cyanomethylene dyes such as dicyanostyrene and tricyanostyrene dyes; thiazine dyes; azine dyes; acridine dyes; azo dyes such as benzeneazo, pyridoneazo, thiopheneazo, isothiazoleazo, pyrroleazo, pyrraleazo, imidazoleazo, thiadiazoleazo, triazoleazo, and disazo dyes; arylidene dyes such as alpha-cyano arylidene pyrazolone and aminopyrazolone arylidene dyes; spiropyran dyes; indolinospiropyran dyes; fluoran dyes; rhodaminelactam dyes; naphthoquinone dyes, such as 2-carbamoyl-4-[N-(p-substituted aminoaryl) imino]-1,4-naphthaquinone; anthraquinone dyes; and quinophthalone dyes. Specific examples of dyes usable herein can include:

C.I. (color index) Disperse Yellow 51, 3, 54, 79, 60, 23, 7, and 141;

C.I. Disperse Blue 24, 56, 14, 301, 334, 165, 19, 72, 87, 287, 154, 26, and 354;

C.I. Disperse Red 135, 146, 59, 1, 73, 60, and 167;

C.I. Disperse Orange 149;

C.I. Disperse Violet 4, 13, 36, 56, and 31;

C.I. Disperse Yellow 56, 14, 16, 29, and 231;

C.I. Solvent Blue 70, 35, 36, 50, 49, 111, 105, 97, and 11;

C.I. Solvent Red 135, 81, 18, 25, 19, 23, 24, 143, 146, and 182;

C.I. Solvent Violet 13;

C.I. Solvent Black 3; and

C.I. Solvent Green 3.

Other suitable cyan dyes can include Kayaset Blue 714 (Solvent Blue 63, manufactured by Nippon Kayaku Co., Ltd.), Phorone Brilliant Blue S—R (Disperse Blue 354, manufactured by Sandoz K.K.).

Other suitable yellow dyes can include Phorone Brilliant Yellow S-6 GL (Disperse Yellow 231, manufactured by Sandoz K.K.) and Macrolex Yellow 6G (Disperse Yellow 201, manufactured by Bayer).

Further examples of useful dyes can be found in U.S. Pat. Nos. 4,541,830; 4,698,651; 4,695,287; 4,701,439; 4,757, 046; 4,743,582; 4,769,360; 4,753,922; 4,910,187; 5,026, 677; 5,101,035; 5,142,089; 5,374,601; 5,476,943; 5,532, 202; 5,804,531; 6,265,345; and U.S. Patent Application Publication No. US 2003/0181331, the disclosures of which are hereby incorporated by reference.

Each dye-donor layer patch can range from 20 wt. % to 90 wt. % dye, relative to the total dry weight of all components in the layer. A high amount of dye is desirable for increased efficiency, but higher amounts of dye can lead to increased occurrences of donor/receiver sticking. Depending on the efficiency of the dye-donor layer, a lower amount of dye can be used to achieve the same efficiency as a different dye-donor layer. The dye percent is ideally chosen in view of the specific donor and receiver combination.

Varying the amount of dye in the donor can aid in matching the efficiency between different dye patches, for example, a cyan, magenta, and yellow patch. For example, yellow and/or magenta patch dye amounts can be between 20 wt. % and 75 wt. % dye relative to the total dry weight of all components in the layer, for example, between 30 wt. % and 50 wt. %. A cyan patch dye amount can be between 40 wt. % and 90 wt. % dye relative to the total dry weight of all components in the layer, for example, between 55 wt. % and 75 wt. %.

To form each color patch of a dye-donor layer, one or more dyes can be dispersed in a polymeric binder. The binder can be used in an amount of from 0.05 g/m$^2$ to 5 g/m$^2$. The polymeric binder can be, for example, a polycarbonate; a poly(styrene-co-acrylonitrile); a poly(sulfone); a poly(phenylene oxide); a polyvinyl butyral, a polyvinyl acetal, a cellulose derivative such as, but not limited to, ethyl cellulose, cellulose acetate hydrogen phthalate, cellulose acetate, cellulose acetate propionate, cellulose acetate butyrate, or cellulose triacetate; or a combination thereof.

The dye-donor layer can have a dye to binder ratio for each color dye patch. For example, a yellow dye to binder ratio can be from 0.3 to 1.2, or from 0.5 to 1.0. A magenta dye to binder ratio can be from 0.5 to 1.5, or from 0.8 to 1.2. A cyan dye to binder ratio can be from 1.0 to 2.5, or from 1.5 to 2.0.

The dye-donor layer of the dye-donor element can be formed or coated on a support. The dye-donor layer composition can be dissolved in a solvent for coating purposes. The dye-donor layer can be formed or coated on the support by techniques such as, but not limited to, a gravure process, spin-coating, solvent-coating, extrusion coating, or other methods known to practitioners in the art.

The support can be formed of any material capable of withstanding the heat of thermal printing. According to various embodiments, the support can be dimensionally stable during printing. Suitable materials can include polyesters, for example, poly(ethylene terephthalate) and poly (ethylene naphthalate); polyamides; polycarbonates; glassine paper; condenser paper; cellulose esters, for example, cellulose acetate; fluorine polymers, for example, poly(vinylidene fluoride) and poly(tetrafluoroethylene-co-hexafluoropropylene); polyethers, for example, polyoxymethylene; polyacetals; polystyrenes; polyolefins, for example, polyethylene, polypropylene, and methylpentane polymers; polyimides, for example, polyimide-amides and polyether-imides; and combinations thereof. The support can have a thickness of from 1 µm to 30 µm, for example, from 3 µm to 7 µm.

According to various embodiments, a subbing layer, for example, an adhesive or tie layer, a dye-barrier layer, or a combination thereof, can be coated between the support and the dye-donor layer. The subbing layer can be one or more layers. The adhesive or tie layer can adhere the dye-donor layer to the support. Suitable adhesives are known to practitioners in the art, for example, Tyzor TBT® from E.I. DuPont de Nemours and Company. The dye-barrier layer can include a hydrophilic polymer. The dye-barrier layer can provide improved dye transfer densities.

The dye-donor element can include a slip layer to reduce or prevent print head sticking to the dye-donor element. The slip layer can be coated on a side of the support opposite the dye-donor layer. The slip layer can include a lubricating material, for example, a surface-active agent, a liquid lubricant, a solid lubricant, or mixtures thereof, with or without a polymeric binder. Suitable lubricating materials can include oils or semi-crystalline organic solids that melt below 100° C., for example, poly(vinyl stearate), beeswax, perfluorinated alkyl ester polyether, poly(caprolactone), carbowax, polyethylene homopolymer, or poly(ethylene glycol). The lubricating material can also be a silicone- or siloxane-containing polymer. Suitable polymers can include graft copolymers, block polymers, copolymers, and polymer blends or mixtures. Suitable polymeric binders for the slip layer can include poly(vinyl alcohol-co-vinylbutyral), poly (vinyl alcohol-co-vinylacetal), polystyrene, poly(vinyl acetate), cellulose acetate butyrate, cellulose acetate, ethyl cellulose, and other binders as known to practitioners in the art. Preferably, the slipping layer formulation most desired for resistive head thermal media incorporates a synergistic combination of lubricants from a friction perspective and in terms of headwear or print head buildup. The preferred slip layer is disclosed in U.S. Pat. No. 7,078,366, incorporated herein by reference. The amount of lubricating material used in the slip layer is dependent, at least in part, upon the type of lubricating material, but can be in the range of from 0.001 to 2 g/m$^2$, although less or more lubricating material can be used as needed. If a polymeric binder is used, the lubricating material can be present in a range of 0.1 to 50 weight %, preferably 0.5 to 40 weight %, of the polymeric binder.

The dye-donor element can include a stick preventative agent to reduce or eliminate sticking between the dye-donor element and the receiver element during printing. The stick preventative agent can be present in any layer of the dye-donor element, so long as the stick preventative agent is capable of diffusing through the layers of the dye-donor element to the dye-donor layer, or transferring from the slip layer to the dye-donor layer. For example, the stick preventative agent can be present in one or more patches of the dye-donor layer, in the support, in an adhesive layer, in a dye-barrier layer, in a slip layer, or in a combination thereof. According to various embodiments, the stick preventative agent can be in the slip layer, the dye-donor layer, or both. According to various embodiments, the stick preventative agent is in the dye-donor layer. The stick preventative agent can be in one or more colored patches of the dye-donor layer, or a combination thereof. If more than one dye patch is present in the dye-donor layer, the stick preventative agent can be present in the last patch of the dye-donor layer to be printed, typically the cyan layer. However, the dye patches can be in any order. For example, if repeating patches of cyan, magenta, and yellow are used in the dye-donor element, in that respective order, the yellow patches, as the last patches printed in each series, can include the stick preventative agent. The stick preventative agent can be a silicone- or siloxane-containing polymer. Suitable polymers can include graft copolymers, block polymers, copolymers, and polymer blends or mixtures. Suitable stick preventative agents are described, for example, in U.S. Pat. No. 7,067,457.

Optionally, release agents as known to practitioners in the art can also be added to the dye-donor element, for example, to the dye-donor layer, the slip layer, or both. Suitable release agents can include, for example, those described in U.S. Pat. Nos. 4,740,496 and 5,763,358.

According to various embodiments, the dye-donor layer may or may not contain plasticizer. However, inclusion of the plasticizer in the dye-donor layer can increase dye-donor efficiency. Useful plasticizers for the dye-donor element can include plasticizers known in the art, such as those described in U.S. Pat. Nos. 5,830,824 and 5,750,465, and references disclosed therein. Suitable plasticizers can be defined as compounds having a glass transition temperature (Tg) less than 25° C., a melting point (Tm) less than 25° C., or both. Plasticizers useful for this invention can include low molecular weight plasticizers and higher molecular weight plasticizers such as oligomeric or polymeric plasticizers. Examples of suitable plasticizers can include aliphatic polyesters, epoxidized oils, chlorinated hydrocarbons, poly(ethylene glycols), poly(propylene glycols), and poly(vinyl ethyl ether) (PVEE). The molecular weight of the plasticizer can be greater than or equal to 450 to minimize transfer of the plasticizer to the dye-receiving layer during printing. The plasticizer can be present in an amount of from 1 to 50%, for example, from 5% to 35%, by weight of the binder.

Aliphatic polyesters suitable as plasticizers can be derived from succinic acid, glutaric acid, adipic acid, pimelic acid, suberic acid, azelaic acid, and sebacic acid. The aliphatic polyesters can have one or more functional end groups, for example a carboxyl, hydroxyl, or alkoxyl group, where each alkoxyl group can be from 1 to 18 carbon atoms. Examples of suitable aliphatic polyesters can include Drapex plasticizers (Crompton/Witco Corporation, Middlebury, Conn., USA), such as Drapex 429, and Admex plasticizers (Velsicol Chemical Corporation, Rosemont, Ill., USA) such as Admex 429, and PARAPLEX® G25, Plasthall HA7A, Plasthall P650, Plasthall P-7092, all from CP Hall Company, Chicago, Ill., USA.

Epoxidized oils suitable as plasticizers can include partially or completely epoxidized natural oils, and partially or completely epoxidized derivatized natural oils such as epoxidized soybean oil sold as PARAPLEX® G-60, PARAPLEX® G-62, and Plasthall ESO; epoxidized linseed oil sold as Plasthall ELO; or epoxidized octyl tallate sold as Plasthall S-73, all from C. P. Hall Company.

Chlorinated hydrocarbons suitable for use as plasticizers can include long-chain hydrocarbons or paraffins consisting of methylene, methyl, methane or alkene groups, all of which can have a chlorine substitution. The length of the long-chain hydrocarbon can be between 8 and 30 carbon atoms, for example, between 12 and 24 carbon atoms. The chains can be branched. The amount of chlorine in the paraffin can be between 25 and 75 wt %, for example, between 40 and 70 wt %. Mixtures of chlorinated paraffins can also be used. According to certain embodiments, the chlorinated paraffins can have the formula $C_xH_yC_z$ wherein x is between 11 and 24, y is between 14 and 43, and z is between 3 and 10. Examples of suitable chlorinated hydrocarbons can include Chlorowax liquids sold by Occidental Chemical Corp., Dallas, Tex., USA, and Paroil paraffins sold by Dover Chemical Corp., Dover, Ohio, USA, such as Chlorowax 40 and Paroil 170HV.

Poly(ethylene glycols) and poly(propylene glycols) suitable for use as plasticizers can have unsubstituted end groups (OH), or they can be substituted with one or more functional groups such as an alkoxyl group or fatty acid, where each alkoxyl group or fatty acid can be from 1 to 18 carbon atoms. Examples of suitable poly(ethylene glycols) and poly(propylene glycols) can include TegMer 809 poly (ethylene glycol) from C. P. Hall Co., and PPG #483 poly(propylene glycol) from Scientific Polymer Products, Ontario, N.Y., USA.

The dye-donor layer can include beads. The beads can have a particle size of from 0.5 to 20 microns, preferably from 2.0 to 15 microns. The beads can act as spacer beads under the compression force of a wound up dye-donor roll, improving raw stock keeping of the dye-donor roll by reducing the material transferred from the dye-donor layer to the slipping layer, as measured by the change in sensitometry under accelerated aging conditions, or the appearance of unwanted dye in the laminate layer, or from the backside of the dye-donor element, for example, a slipping layer, to the dye-donor layer. The use of the beads can result in reduced mottle and improved image quality. The beads can be employed in any amount effective for the intended purpose. In general, good results have been obtained at a coverage of from 0.003 to 0.20 g/m$^2$. Beads suitable for the dye-donor layer can also be used in the slip layer.

The beads in the dye-donor layer can be crosslinked, elastomeric beads. The beads can have a glass transition temperature (Tg) of 45° C. or less, for example, 10° C. or less. The elastomeric beads can be made from an acrylic polymer or copolymer, such as butyl-, ethyl-, propyl-, hexyl-, 2-ethylhexyl-, 2-chloroethyl-, 4-chlorobutyl- or 2-ethoxyethyl-acrylate or methacrylate; acrylic acid; methacrylic acid; hydroxyethyl acrylate; a styrenic copolymer, such as styrene-butadiene, styrene-acrylonitrile-butadiene, styrene-isoprene, or hydrogenated styrene-butadiene; or mixtures thereof. The elastomeric beads can be crosslinked with various crosslinking agents, which can be part of the elastomeric copolymer, such as but not limited to divinylbenzene; ethylene glycol diacrylate; 1,4-cyclohexylene-bis(oxyethyl) dimethacrylate; 1,4-cyclohexylene-bis(oxypropyl) diacrylate; 1,4-cyclohexylene-bis(oxypropyl) dimethacrylate; and ethylene glycol dimethacrylate. The elastomeric beads can have from 1 to 40%, for example, from 5 to 40%, by weight of a crosslinking agent.

The beads in the dye-donor layer can be hard polymeric beads. Suitable beads can include divinylbenzene beads, beads of polystyrene crosslinked with at least 20 wt. % divinylbenzene, and beads of poly(methyl methacrylate) crosslinked with at least 20 wt. % divinylbenzene, ethylene glycol dimethacrylate, 1,4-cyclohexylene-bis(oxyethyl) dimethacrylate, 1,4-cyclohexylene-bis(oxypropyl) dimethacrylate, or other crosslinking monomers known to those familiar with the art.

The dye-donor element can be a sheet of one or more colored patches or laminate, or a continuous roll or ribbon. The continuous roll or ribbon can include one patch of a monochromatic color or laminate, or can have alternating areas of different patches, for example, one or more dye patches of cyan, magenta, yellow, or black, one or more laminate patches, or a combination thereof.

The receiver element suitable for use with the dye-donor element described herein can be any receiver element as known to practitioners in the art. For example, the receiver element can include a support having thereon a dye image-receiving layer. The support can be a transparent film. Transparent supports include cellulose derivatives, for example, a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof, polyimides; polyamides; polycarbonates; polystyrene; poly(vinyl alcohol-co-vinlyacetal); polyolefins, such as polyethylene or polypropylene; polysulfones; polyacrylates; polyetherimides; and mixtures thereof. Opaque supports can include plain paper, coated paper, synthetic paper, photographic paper support, melt-extrusion-coated paper, and laminated paper, such as biaxially oriented support laminates. Biaxially oriented support laminates suitable for use as receivers are described in U.S. Pat. Nos. 5,853,965; 5,866,282; 5,874,205; 5,888,643; 5,888,681; 5,888,683; and 5,888,714. Biaxially oriented supports can include a paper base and a biaxially oriented polyolefin sheet, for example, polypropylene, laminated to one or both sides of the paper base. The support can be a reflective paper, for example, baryta-coated paper, white polyester (polyester with white pigment incorporated therein), an ivory paper, a condenser paper, or a synthetic paper, for example, DuPont Tyvek® by E.I. DuPont de Nemours and Company, Wilmington, Del. The support can be employed at any desired thickness, for example, from 10 µm to 1000 µm. Exemplary supports for the dye image-receiving layer are disclosed in commonly assigned U.S. Pat. Nos. 5,244,861 and 5,928,990, and in EP-A-0671281. Other suitable supports as known to practitioners in the art can also be used. According to various embodiments, the support can be a composite or laminate structure comprising a base layer and one or more additional layers. The base layer can comprise more than one material, for example, a combination of one or more of a microvoided layer, a foamed layer, a nonvoided layer, a synthetic paper, a natural paper, and a polymer.

The dye image-receiving layer of the receiver element can be, for example, a polycarbonate, a polyurethane, a polyester, polyvinyl chloride, poly(styrene-co-acrylonitrile), poly (caprolactone), poly(vinyl chloride-co-vinyl acetate), poly (ethylene-co-vinyl acetate), polyvinylacetals such as polyvinylbutyral or polyvinylheptal, polymethacrylates including those described in U.S. Pat. No. 6,361,131, or combinations thereof. The dye image-receiving layer can be coated on the receiver element support in any amount effective for the intended purpose of receiving the dye from the dye-donor layer of the dye-donor element. For example, the dye image-receiving layer can be coated in an amount of from 1 g/m$^2$ to 5 g/m$^2$. Additional polymeric layers can be present between the support and the dye image-receiving layer. The additional layers can provide coloring, adhesion, antistat properties, act as a dye-barrier, act as a dye mordant layer, or a combination thereof. For example, a polyolefin such as polyethylene or polypropylene can be present. White pigments such as titanium dioxide, zinc oxide, and the like can be added to the polymeric layer to provide reflectivity. A subbing layer optionally can be used over the polymeric layer in order to improve adhesion to the dye image-receiving layer. This can be called an adhesive or tie layer. Exemplary subbing layers are disclosed in U.S. Pat. Nos. 4,748,150, 4,965,238, 4,965,239, and 4,965,241. An antistatic layer as known to practitioners in the art can also be used in the receiver element. The receiver element can also include a backing layer. Suitable examples of backing layers include those disclosed in U.S. Pat. Nos. 5,011,814 and 5,096,875.

The dye image-receiving layer, or an overcoat layer thereon, can contain a release agent, for example, a silicone or fluorine based compound, as is conventional in the art. Various exemplary release agents are disclosed, for example, in U.S. Pat. Nos. 4,820,687 and 4,695,286.

The receiver element can also include stick preventative agents, as described for the donor element. According to various embodiments, the receiver element and dye-donor element can include the same stick preventative agent.

The dye image-receiving layer can be formed on the support by any method known to practitioners in the art, including but not limited to printing, solution coating, dip coating, and extrusion coating. Wherein the dye image-receiving layer is extruded, the process can include (a) forming a melt comprising a thermoplastic material; (b) extruding or coextruding the melt as a single-layer film or a layer of a composite (multilayer or laminate) film; and (c) applying the extruded film to the support for the receiver element.

The dye-donor element and receiver element, when placed in superposed relationship such that the dye-donor layer of the dye-donor element is adjacent the dye image-receiving layer of the receiver element, can form a print assembly. An image can be formed by passing the print assembly past a print head, wherein the print head is located on the side of the dye-donor element opposite the receiver element. The print head can apply heat image-wise or patch-wise to the dye-donor element, causing the dyes or laminate in the dye-donor layer to transfer to the dye image-receiving layer of the receiver element.

Thermal print heads that can be used with the print assembly are available commercially and known to practitioners in the art. Exemplary thermal print heads can include, but are not limited to, a Fujitsu Thermal Head (FTP-040 MCSOO1), a TDK Thermal Head F415 HH7-1089, a Rohm Thermal Head KE 2008-F3, a Shinko head (TH300U162P-001), and Toshiba heads (TPH162R1 and TPH207R1A).

Although the preferred use of the present inventive urea light stabilizers is in the dye-donor layers of thermal dye transfer systems, these compounds may also be useful in laser sublimation transfer, ink jet color hard copy, and silver halide color paper applications.

EXAMPLES

Example 1

Synthesis of Urea Stabilizing Compound SE-2

5 g (0.0326 moles) of 2,5-dimethoxyaniline [CAS RN 102-56-7] was dissolved in 25 ml of tetrahydrofuran in a 100 ml round bottom flask equipped with a stir bar. 5 g (0.0326 moles) of octyl isocyanate [CAS RN 3158-26-7] was added dropwise and the mixture was capillary stoppered and allowed to stir overnight for a total reaction time of 15 hrs. A thin layer chromatography (TLC) ($CH_2Cl_2$) of the reaction mixture showed primarily one new spot. The reaction mixture was concentrated to dryness on the rotary evaporator and the solid was recrystallized from ethyl acetate. The recrystallized material still showed an impurity at the origin by TLC($CH_2Cl_2$) so it was further purified by column chromatography. ($SiO_2$; 2/98 acetone/$CH_2Cl_2$ as eluant). 55% purified yield. MP 119° C.

Yields and melting points for other compounds of this invention are shown in Table 1.

Materials used in the Examples 2-6 include the following:

AQUALON® N50 (48.0-49.5% ethoxyl content) polymeric binder from Hercules Chemical, Wilmington, Del., and PARAPLEX® G25 polyester sebacate ($T_m$-20° C., $M_w$ 8000) from CP Hall Company.

Receiver

A receiver of the composition shown below was prepared, having an overall thickness of about 220 μm and a thermal dye receiver layer thickness of about 3 μm. It was prepared by solvent coating the subbing layer and dye receiving layer onto the prepared paper support. The receiver composition was the same for all examples.

---

4-8 μm divinyl benzene beads and solvent coated, cross-linked polyol dye receiving layer
Subbing layer
Microvoided composite film OPPalyte 350 K18 (ExxonMobil)
Pigmented polyethylene
Cellulose Paper
Polyethylene
Polypropylene film

---

The following Comparative and Inventive elements were prepared for use in Examples 2-6.

Yellow Donor Element YDE-1:

A yellow dye-donor element was prepared by coating the following layers in the order recited on a first side of a 4.5 micron poly(ethylene terephthalate) support:

(1) a subbing layer of a titanium alkoxide (Tyzor TBT® from E.I DuPont de Nemours and Company) (0.16 g/m$^2$) from n-propyl acetate and n-butyl alcohol solvent mixture; and (2) a dye-donor layer containing a composition of Yellow Dye Set 1 as follows: Yellow Dye Y-1 at 0.0785 g/m$^2$ and Yellow Dye Y-2 at 0.0978 g/m$^2$, AQUALON® N50 ethyl cellulose(Hercules Chemical, Wilmington, Del.) binder at 0.2283 g/m$^2$, and 2 micron divinyl benzene beads at 0.0037 g/m$^2$ coated from a solvent mixture of 75 wt. % toluene, 20 wt. % methanol, and 5 wt. % cyclopentanone.

On a second side of the support, a slipping layer was prepared by coating the following layers in the order recited:

(1) a subbing layer of a titanium alkoxide (Tyzor TBT®) (0.16 g/m2) from n-propyl acetate and n-butyl alcohol solvent mixture, and (2) a slipping layer containing an ethene polymer of Polywax 400® (0.02 g/m$^2$), a polyalphaolefin of Vybar 103® (0.02 g/m$^2$), and a maleic anhydride copolymer of Ceremer 1608 (0.02 g/m$^2$), all from Baker-Petrolite Polymers, Sugar Land, Tex., and a poly(vinyl acetal) binder (0.41 g/m$^2$) (KS-1 from Sekisui, Japan) coated from a solvent mixture of 75 wt. % toluene, 20 wt. % methanol, and 5 wt. % cyclopentanone.

Magenta Donor Element MDE-1, Without Stabilizers:

A magenta dye-donor element was prepared by coating the following layers in the order recited on a first side of a 4.5 micron poly(ethylene terephthalate) support:

(1) a subbing layer of a titanium alkoxide (Tyzor TBT® from E.I DuPont de Nemours and Company) (0.16 g/m$^2$) from n-propyl acetate and n-butyl alcohol solvent mixture; and (2) a dye-donor layer containing a composition of 0.00067 moles/m$^2$ of Magenta Dye Set 1 as follows: Magenta Dye M-1 at 0.0651 g/m$^2$, Magenta Dye M-2 at 0.136 g/m$^2$, and Magenta Dye M-3 at 0.0597 g/m$^2$, AQUALON® N50 ethyl cellulose (Hercules Chemical, Wilmington, Del.) binder at 0.2283 g/m$^2$, and 2 micron divinyl benzene beads at 0.0037 g/m$^2$ were coated from a solvent mixture of 75 wt. % toluene, 20 wt. % methanol, and 5 wt. % cyclopentanone.

On a second side of the support, a slipping layer was prepared by coating the following layers in the order recited:

(1) a subbing layer of a titanium alkoxide (Tyzor TBT®) (0.16 g/m2) from n-propyl acetate and n-butyl alcohol solvent mixture, and (2) a slipping layer containing an ethene polymer of Polywax 400® (0.02 g/m²), a polyalphaolefin of Vybar 103® (0.02 g/m²), and a maleic anhydride copolymer of Ceremer 1608 (0.02 g/m²), all from Baker-Petrolite Polymers, Sugar Land, Tex., and a poly(vinyl acetal) binder (0.41 g/m²) (KS-1 from Sekisui, Japan) coated from a solvent mixture of 75 wt. % toluene, 20 wt. % methanol, and 5 wt. % cyclopentanone.

Inventive Magenta Donor Element MDE-2, With Stabilizer:

A magenta dye-donor element was prepared by coating the following layers in the order recited on a first side of a 4.5 micron poly(ethylene terephthalate) support:

(1) a subbing layer of a titanium alkoxide (Tyzor TBT® from E.I DuPont de Nemours and Company) (0.16 g/m²) from n-propyl acetate and n-butyl alcohol solvent mixture; and (2) a dye-donor layer containing a composition of 0.00067 moles/m² of Magenta Dye Set 1 as follows: Magenta Dye M-1 at 0.0651 g/m², Magenta Dye M-2 at 0.136 g/m², and Magenta Dye M-3 at 0.0597 g/m², AQUALON® N50 ethyl cellulose (Hercules Chemical, Wilmington, Del.) binder at 0.2283 g/m², and 2 micron divinyl benzene beads at 0.0037 g/m² and inventive stabilizer compounds at 0.0005 moles/m² (0.75 molar ratio) or 0.00024 moles/m² (0.35 molar ratio) were coated from a solvent mixture of 75 wt. % toluene, 20 wt. % methanol, and 5 wt. % cyclopentanone.

Control donor elements were prepared as above except that they had the following stabilizing compound, tetraalkoxy aryl antioxidant compound (AO):

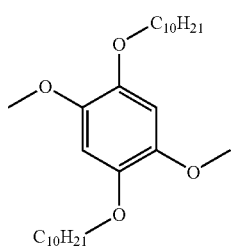

AO (from U.S. Pat. No. 4,705,522, compound 1, and U.S. Pat. No. 4,855,281, compound 6, discussed above and in the Background)

On a second side of the support, a slipping layer was prepared by coating the following layers in the order recited:

(1) a subbing layer of a titanium alkoxide (Tyzor TBT®) (0.16 g/m2) from n-propyl acetate and n-butyl alcohol solvent mixture, and (2) a slipping layer containing an ethene polymer of Polywax 400® (0.02 g/m²), a polyalphaolefin of Vybar 103® (0.02 g/m²), and a maleic anhydride copolymer of Ceremer 1608 (0.02 g/m²), all from Baker-Petrolite Polymers, Sugar Land, Tex., and a poly(vinyl acetal) binder (0.41 g/m²) (KS-1 from Sekisui, Japan) coated from a solvent mixture of 75 wt. % toluene, 20 wt. % methanol, and 5 wt. % cyclopentanone.

Magenta Donor Element MDE-3, Without Stabilizers:

A magenta dye-donor element was prepared by coating the following layers in the order recited on a first side of a 4.5 micron poly(ethylene terephthalate) support:

(1) a subbing layer of a titanium alkoxide (Tyzor TBT® from E.I DuPont de Nemours and Company) (0.16 g/m²) from n-propyl acetate and n-butyl alcohol solvent mixture; and (2) a dye-donor layer containing a composition of 0.00051 moles/m² of Magenta Dye Set 2 as follows: Magenta Dye M-4 at 0.1262 g/m², Magenta Dye M-2 at 0.0421 g/m², and Magenta Dye M-5 at 0.0421 g/m², AQUALON® N50 ethyl cellulose (Hercules Chemical, Wilmington, Del.) binder at 0.2283 g/m², and 2 micron divinyl benzene beads at 0.0037 g/m² were coated from a solvent mixture of 75 wt. % toluene, 20 wt. % methanol, and 5 wt. % cyclopentanone.

On a second side of the support, a slipping layer was prepared by coating the following layers in the order recited:

(1) a subbing layer of a titanium alkoxide (Tyzor TBT®) (0.16 g/m2) from n-propyl acetate and n-butyl alcohol solvent mixture, and (2) a slipping layer containing an ethene polymer of Polywax 400® (0.02 g/m²), a polyalphaolefin of Vybar 103® (0.02 g/m²), and a maleic anhydride copolymer of Ceremer 1608 (0.02 g/m²), all from Baker-Petrolite Polymers, Sugar Land, Tex., and a poly(vinyl acetal) binder (0.41 g/m²) (KS-1 from Sekisui, Japan) coated from a solvent mixture of 75 wt. % toluene, 20 wt. % methanol, and 5 wt. % cyclopentanone.

Inventive Magenta Donor Element MDE-4, With Stabilizers:

A magenta dye-donor element for use in was prepared by coating the following layers in the order recited on a first side of a 4.5 micron poly(ethylene terephthalate) support:

(1) a subbing layer of a titanium alkoxide (Tyzor TBT® from E.I DuPont de Nemours and Company) (0.16 g/m²) from n-propyl acetate and n-butyl alcohol solvent mixture; and (2) a dye-donor layer containing a composition of 0.00051 moles/m² of Magenta Dye Set 2 as follows: Magenta Dye M-4 at 0.1262 g/m², Magenta Dye M-2 at 0.0421 g/m², and Magenta Dye M-5 at 0.0421 g/m², AQUALON® N50 ethyl cellulose (Hercules Chemical, Wilmington, Del.) binder at 0.2283 g/m², and 2 micron divinyl benzene beads at 0.0037 g/m² and inventive stabilizer compounds at 0.00038 moles/m² (0.75 molar ratio) or 0.00018 moles/m² (0.35 molar ratio) were coated from a solvent mixture of 75 wt. % toluene, 20 wt. % methanol, and 5 wt. % cyclopentanone.

On a second side of the support, a slipping layer was prepared by coating the following layers in the order recited:

(1) a subbing layer of a titanium alkoxide (Tyzor TBT®) (0.16 g/m2) from n-propyl acetate and n-butyl alcohol solvent mixture, and (2) a slipping layer containing an ethene polymer of Polywax 400® (0.02 g/m²), a polyalphaolefin of Vybar 103® (0.02 g/m²), and a maleic anhydride copolymer of Ceremer 1608 (0.02 g/m²), all from Baker-Petrolite Polymers, Sugar Land, Tex., and a poly(vinyl acetal) binder (0.41 g/m²) (KS-1 from Sekisui, Japan) coated from a solvent mixture of 75 wt. % toluene, 20 wt. % methanol, and 5 wt. % cyclopentanone.

Cyan Donor Element CDE-1:

A cyan dye-donor element for use was prepared by coating the following layers in the order recited on a first side of a 4.5 micron poly(ethylene terephthalate) support:

(1) a subbing layer of a titanium alkoxide (Tyzor TBT®) from E.I DuPont de Nemours and Company) (0.16 g/m$^2$) from n-propyl acetate and n-butyl alcohol solvent mixture; and (2) a dye-donor layer containing a composition of 0.00097 moles/m$^2$ of Cyan Dye Set 1 as follows: Cyan Dye C-1 at 0.086 g/m$^2$, Cyan Dye C-2 at 0.078 g/m$^2$, and Cyan Dye C-3 at 0.196 g/m$^2$, AQUALON® N50 ethyl cellulose (Hercules Chemical, Wilmington, Del.) binder at 0.2283 g/m$^2$, and 2 micron divinyl benzene beads at 0.0037 g/m$^2$ and were coated from a solvent mixture of 75 wt. % toluene, 20 wt. % methanol, and 5 wt. % cyclopentanone.

On a second side of the support, a slipping layer was prepared by coating the following layers in the order recited:

(1) a subbing layer of a titanium alkoxide (Tyzor TBT®) (0.16 g/m2) from n-propyl acetate and n-butyl alcohol solvent mixture, and (2) a slipping layer containing an ethene polymer of Polywax 400® (0.02 g/m$^2$), a polyalphaolefin of Vybar 103® (0.02 g/m$^2$), and a maleic anhydride copolymer of Ceremer 1608 (0.02 g/m$^2$), all from Baker-Petrolite Polymers, Sugar Land, Tex., and a poly(vinyl acetal) binder (0.41 g/m$^2$) (KS-1 from Sekisui, Japan) coated from a solvent mixture of 75 wt. % toluene, 20 wt. % methanol, and 5 wt. % cyclopentanone.

Cyan Donor Element CDE-2:

A cyan dye-donor element for use in was prepared by coating the following layers in the order recited on a first side of a 4.5 micron poly(ethylene terephthalate) support:

(1) a subbing layer of a titanium alkoxide (Tyzor TBT®) from E.I DuPont de Nemours and Company) (0.16 g/m$^2$) from n-propyl acetate and n-butyl alcohol solvent mixture; and (2) a dye-donor layer containing a composition of 0.00094 moles/m$^2$ of Cyan Dye Set 2 as follows: Cyan Dye C-4 at 0.306 g/m$^2$, Cyan Dye C-5 at 0.054 g/m$^2$, AQUALON® N50 ethyl cellulose (Hercules Chemical, Wilmington, Del.) binder at 0.2283 g/m$^2$, and 2 micron divinyl benzene beads at 0.0037 g/m$^2$ and were coated from a solvent mixture of 75 wt. % toluene, 20 wt. % methanol, and 5 wt. % cyclopentanone.

On a second side of the support, a slipping layer was prepared by coating the following layers in the order recited:

(1) a subbing layer of a titanium alkoxide (Tyzor TBT®) (0.16 g/m2) from n-propyl acetate and n-butyl alcohol solvent mixture, and (2) a slipping layer containing an ethene polymer of Polywax 400® (0.02 g/m$^2$), a polyalphaolefin of Vybar 103® (0.02 g/m$^2$), and a maleic anhydride copolymer of Ceremer 1608 (0.02 g/m$^2$), all from Baker-Petrolite Polymers, Sugar Land, Tex., and a poly(vinyl acetal) binder (0.41 g/m$^2$) (KS-1 from Sekisui, Japan) coated from a solvent mixture of 75 wt. % toluene, 20 wt. % methanol, and 5 wt. % cyclopentanone.

Laminate Layer:

A laminate donor element was prepared by coating on the back side of a 4.5 μm poly(ethylene terephthalate) support, in order:

(1) a subbing layer of titanium alkoxide, Tyzor TBT®, (DuPont Corp.) (0.13 g/m$^2$) from a n-propyl acetate and n-butyl alcohol solvent mixture (85/15), and (2) a slipping layer containing an ethene polymer of Polywax 400® (0.02 g/m$^2$), a polyalphaolefin of Vybar 103® (0.02 g/m$^2$), and a maleic anhydride copolymer of Ceremer 1608 (0.02 g/m$^2$), all from Baker-Petrolite Polymers, Sugar Land, Tex., and a poly(vinyl acetal) binder (0.41 g/m$^2$) (KS-1 from Sekisui, Japan) coated from a solvent mixture of 75 wt. % toluene, 20 wt. % methanol, and 5 wt. % cyclopentanone.

On the front side of the element was coated a transferable overcoat layer containing colloidal silica, IPA-ST (Nissan Chemical Co.), at a laydown of 0.46 g/m$^2$, Tinuvin 460® (Ciba Specialty Chemicals), a UV absorbing triazine, at a laydown of 0.11 g/m$^2$, poly(vinyl acetal), KS-10, (Sekisui Co.), at a laydown of 0.63 g/m$^2$, and 4 μm divinylbenzene beads at a laydown of 0.11 g/m$^2$. The materials were dissolved and coated from the solvent 3-pentanone. The laminate composition was the same for all examples.

Printing Procedure

A 15-step patch image of optical density (OD) ranging from $D_{min}$ (OD<0.2) to $D_{max}$ (OD>2.0) was printed for evaluation. When printed using 1.007 msec/line and a resistive head voltage of 25.0 V, this is equivalent to equal energy increments ranging from a print energy of 0 Joules/cm$^2$ to a print energy of 1.449 Joules/cm$^2$. Printing was done manually as described below.

The dye side of the dye-donor element was placed in contact with the dye image-receiving layer of the receiver element of the same width to form a print assembly. The print assembly was fastened to a stepper motor-driven pulling device. The imaging electronics were activated, causing the pulling device to draw the print assembly between the print head and a roller at a rate of about 80 mm/sec. The printing line time was 1.007 msec/line. After each print, the dye-donor element and receiver element were separated manually. The process was repeated for printing each of a yellow, magenta, cyan, and laminate patch on the same receiver to form monochrome, bichrome, and neutral color patches, as known in the art. The Status A reflection density of each printed monochrome magenta, bichrome red (combination of yellow and magenta), bichrome blue (combination of magenta and cyan), and neutral (combination of yellow, magenta, and cyan) patches of the final print 15-step patch image on the receiver was measured using Status A filters with an X-rite Model 820 Reflection Densitometer. The densities were reported as green of the magenta (G), green of the red (GofR), blue of the red (BofR), red of the blue (RofB), green of the blue (GofB), red of the neutral (RofN), green of the neutral (G of N), and blue of the neutral (BofN).

Light Stabilization Evaluation Procedure

The printed images were subjected to High-Intensity Daylight fading for 28 days at 50 Klux, 5400° K light using a Xenon light source, at 32° C. and approximately 25% RH, after which the Status A densities were read. The percent density loss after fade was calculated from a step with an initial density of approximately 1.0. The results of the simulated daylight fade testing are shown in Examples 2-6.

Example 2

Prints were prepared from Donor Elements YDE-1, MDE-1 or MDE-2, and CDE-1 as described in Table 2. Print speed was 1.007 msec/line and a resistive head voltage of 28.0 V. The printed images were subjected to High-Intensity Daylight fading for 28 days at 50 Klux, 5400° K light using a Xenon light source, at 32° C. and approximately 25% RH, after which the Status A densities were read. The percent density loss after fade was calculated from a step with an initial density of approximately 1.0. The results of the simulated daylight fade testing are as follows:

TABLE 2

| Stabilizer | Donor Element | Laydown Mole ratio Stabilizers to magenta dyes | Magenta G | Bichrome Red GofR | Bichrome Red BofR | Bichrome Blue RofB | Bichrome Blue GofB | Neutral RofN | Neutral GofN | Neutral BofN |
|---|---|---|---|---|---|---|---|---|---|---|
| None (control) | MDE-1 | none | 28 | 40 | 46 | 28 | 15 | 28 | 15 | 11 |
| AO (control) | MDE-2 | 0.75 | 34 | 39 | 44 | 32 | 20 | 31 | 19 | 7 |
| AO (control) |  | 0.35 | 31 | 40 | 46 | 30 | 18 | 29 | 19 | 10 |
| SE-1 (Inv.) | MDE-2 | 0.75 | 33 | 42 | 47 | 28 | 16 | 27 | 15 | 9 |
| SE-1 (Inv.) |  | 0.35 | 31 | 39 | 44 | 27 | 15 | 24 | 14 | 8 |
| SE-2 (Inv.) | MDE-2 | 0.75 | 34 | 42 | 48 | 29 | 18 | 27 | 17 | 8 |
| SE-2 (Inv.) |  | 0.35 | 31 | 40 | 47 | 28 | 17 | 27 | 16 | 10 |
| SE-3 (Inv.) | MDE-2 | 0.75 | 33 | 42 | 46 | 29 | 16 | 27 | 15 | 6 |
| SE-3 (Inv.) |  | 0.35 | 31 | 41 | 47 | 28 | 16 | 26 | 15 | 9 |
| SE-4 (Inv.) | MDE-2 | 0.75 | 31 | 41 | 46 | 28 | 15 | 25 | 14 | 9 |
| SE-4 (Inv.) |  | 0.35 | 31 | 40 | 45 | 27 | 15 | 26 | 15 | 9 |
| SE-5 (Inv.) | MDE-2 | 0.75 | 34 | 42 | 49 | 29 | 18 | 28 | 17 | 8 |
| SE-5 (Inv.) |  | 0.35 | 30 | 42 | 48 | 28 | 16 | 26 | 16 | 9 |
| SE-6 (Inv.) | MDE-2 | 0.75 | 31 | 41 | 45 | 27 | 14 | 26 | 13 | 8 |
| SE-6 (Inv.) |  | 0.35 | 29 | 39 | 44 | 26 | 14 | 25 | 14 | 9 |

As shown in the Table 2 above the compounds of this invention are particularly suitable for stabilization of the yellow dyes in a neutral tone patch, without image degradation of the bichrome red or blue patches. Particularly valuable are those materials with molecular weight below 400 and cLogP 5 to clogP 8, as reported in Table I.

Example 3

Prints were prepared from Donor Elements YDE-1, MDE-3 or MDE-4, and CDE-1 as described in Table 3. Print speed was 1.007 msec/line and a resistive head voltage of 28.0 V. The printed images were subjected to High-Intensity Daylight fading for 28 days at 50 Klux, 5400° K light using a Xenon light source, at 32° C. and approximately 25% RH, after which the Status A densities were read. The percent density loss after fade was calculated from a step with an initial density of approximately 1.0. The results of the simulated daylight fade testing are as follows:

TABLE 3

| Stabilizer | Donor Element | Laydown Mole ratio Stabilizers to magenta dyes | Magenta G | Bichrome Red GofR | Bichrome Red BofR | Bichrome Blue RofB | Bichrome Blue GofB | Neutral RofN | Neutral GofN | Neutral BofN |
|---|---|---|---|---|---|---|---|---|---|---|
| None (control) | MDE-3 | none | 21 | 36 | 40 | 35 | 16 | 34 | 15 | 14 |
| AO (control) | MDE-4 | 0.75 | 25 | 34 | 38 | 36 | 16 | 33 | 15 | 10 |
| AO (control) |  | 0.35 | 23 | 35 | 37 | 36 | 19 | 34 | 16 | 10 |
| SE-1 (Inv.) | MDE-4 | 0.75 | 25 | 37 | 39 | 34 | 14 | 33 | 12 | 11 |
| SE-1 (Inv.) |  | 0.35 | 22 | 34 | 38 | 34 | 15 | 31 | 13 | 11 |
| SE-2 (Inv.) | MDE-4 | 0.75 | 27 | 38 | 43 | 37 | 17 | 34 | 15 | 11 |
| SE-2 (Inv.) |  | 0.35 | 23 | 36 | 40 | 36 | 17 | 34 | 15 | 12 |
| SE-3 (Inv.) | MDE-4 | 0.75 | 26 | 38 | 42 | 37 | 17 | 34 | 15 | 10 |
| SE-3 (Inv.) |  | 0.35 | 22 | 35 | 40 | 36 | 17 | 34 | 15 | 11 |
| SE-4 (Inv.) | MDE-4 | 0.75 | 20 | 35 | 37 | 33 | 13 | 31 | 12 | 11 |
| SE-4 (Inv.) |  | 0.35 | 20 | 33 | 36 | 32 | 12 | 30 | 11 | 11 |
| SE-5 (Inv.) | MDE-4 | 0.75 | 26 | 38 | 43 | 36 | 16 | 33 | 15 | 12 |
| SE-5 (Inv.) |  | 0.35 | 22 | 35 | 40 | 35 | 15 | 33 | 14 | 12 |
| SE-6 (Inv.) | MDE-4 | 0.75 | 20 | 37 | 38 | 33 | 12 | 30 | 10 | 11 |
| SE-6 (Inv.) |  | 0.35 | 22 | 35 | 38 | 34 | 13 | 32 | 12 | 11 |

As shown in the Table 3, the compounds of this invention are particularly suitable for stabilization of the neutral tone patch without image degradation of the bichrome red or blue patches. Special stabilization of the yellow image dyes in the neutral tone patch is demonstrated by the materials of this invention. Especially favored materials have cLogP values greater than 5.

Example 4

Prints were prepared from Donor Elements YDE-1, MDE-1 or MDE-2, and CDE-1 as described in Table 4. Print speed was 1.007 msec/line and a resistive head voltage of 25.0 V. The printed images were subjected to High-Intensity Daylight fading for 28 days at 50 Klux, 5400° K light using a Xenon light source, at 32° C. and approximately 25% RH, after which the Status A densities were read. The percent density loss after fade was calculated from a step with an initial density of approximately 1.0. The results of the simulated daylight fade testing are as follows:

TABLE 4

| Stabilizer | Donor Element | Laydown Mole ratio Stabilizers to magenta dyes | Magenta G | Bichrome Red | | Bichrome Blue | | Neutral | | |
|---|---|---|---|---|---|---|---|---|---|---|
| | | | | GofR | BofR | RofB | GofB | RofN | GofN | BofN |
| None (control) | MDE-1 | none | 25 | 28 | 39 | 26 | 14 | 26 | 14 | 13 |
| AO control | MDE-2 | 0.75 | 24 | 25 | 34 | 28 | 16 | 27 | 15 | 9 |
| AO (control) | | 0.35 | 24 | 27 | 37 | 27 | 16 | 26 | 15 | 11 |
| SE-3 (Inv.) | MDE-2 | 0.75 | 25 | 28 | 39 | 27 | 15 | 27 | 14 | 11 |
| SE-3 (Inv.) | | 0.35 | 25 | 28 | 39 | 27 | 15 | 26 | 15 | 11 |
| SE-7 (Inv.) | MDE-2 | 0.75 | 24 | 29 | 40 | 28 | 15 | 27 | 14 | 11 |
| SE-7 (Inv.) | | 0.35 | 24 | 28 | 40 | 27 | 15 | 26 | 14 | 12 |
| SE-8 (Inv.) | MDE-2 | 0.75 | 25 | 29 | 40 | 27 | 14 | 26 | 13 | 10 |
| SE-8 (Inv.) | | 0.35 | 25 | 28 | 39 | 27 | 15 | 26 | 14 | 11 |
| SE-9 (Inv.) | MDE-2 | 0.75 | 26 | 29 | 40 | 27 | 14 | 25 | 13 | 10 |
| SE-9 (Inv.) | | 0.35 | 25 | 28 | 39 | 26 | 14 | 26 | 14 | 11 |
| SE-10 (Inv.) | MDE-2 | 0.75 | 24 | 28 | 39 | 28 | 15 | 25 | 15 | 11 |
| SE-10 (Inv.) | | 0.35 | 24 | 28 | 37 | 26 | 14 | 25 | 14 | 11 |
| SE-11 (Inv.) | MDE-2 | 0.75 | 24 | 28 | 39 | 27 | 15 | 27 | 14 | 11 |
| SE-11 (Inv.) | | 0.35 | 24 | 28 | 39 | 27 | 15 | 26 | 14 | 11 |

As shown in Table 4, the compounds of this invention are particularly suitable for stabilization of the yellow dyes in a neutral tone patch, without image degradation of the bichrome red or blue patches.

Example 5

Prints were prepared from Donor Elements YDE-1, MDE-3 or MDE-4, and CDE-2 as described in Table 5. Print speed was 1.007 msec/line and a resistive head voltage of 25.0 V. The printed images were subjected to High-Intensity Daylight fading for 28 days at 50 Klux, 5400° K light using a Xenon light source, at 32° C. and approximately 25% RH, after which the Status A densities were read. The percent density loss after fade was calculated from a step with an initial density of approximately 1.0. The results of the simulated daylight fade testing are as follows:

TABLE 5

| Stabilizer | Donor Element | Laydown Mole ratio Stabilizers to magenta dyes | Magenta G | Bichrome Red | | Bichrome Blue | | Neutral | | |
|---|---|---|---|---|---|---|---|---|---|---|
| | | | | GofR | BofR | RofB | GofB | RofN | GofN | BofN |
| None (control) | MDE-3 | none | 15 | 23 | 29 | 25 | 13 | 34 | 14 | 17 |
| AO control | MDE-4 | 0.75 | 18 | 25 | 31 | 30 | 17 | 37 | 19 | 19 |
| AO (control) | | 0.35 | 17 | 22 | 28 | 28 | 14 | 35 | 15 | 16 |
| SE-3 (Inv.) | MDE-4 | 0.75 | 19 | 27 | 34 | 32 | 18 | 40 | 19 | 20 |
| SE-3 (Inv.) | | 0.35 | 16 | 22 | 29 | 28 | 14 | 34 | 14 | 16 |
| SE-7 (Inv.) | MDE-4 | 0.75 | 17 | 24 | 29 | 27 | 13 | 34 | 14 | 16 |
| SE-7 (Inv.) | | 0.35 | 16 | 22 | 28 | 25 | 13 | 32 | 13 | 16 |
| SE-8 (Inv.) | MDE-4 | 0.75 | 16 | 22 | 28 | 26 | 12 | 33 | 11 | 14 |
| SE-8 (Inv.) | | 0.35 | 16 | 22 | 28 | 26 | 12 | 33 | 12 | 15 |
| SE-9 (Inv.) | MDE-4 | 0.75 | 17 | 23 | 28 | 25 | 12 | 32 | 12 | 14 |
| SE-9 (Inv.) | | 0.35 | 15 | 21 | 27 | 24 | 12 | 30 | 12 | 14 |
| SE-10 (Inv.) | MDE-4 | 0.75 | 16 | 22 | 29 | 27 | 14 | 33 | 13 | 15 |
| SE-10 (Inv.) | | 0.35 | 16 | 23 | 29 | 26 | 13 | 34 | 14 | 17 |
| SE-11 (Inv.) | MDE-4 | 0.75 | 16 | 23 | 28 | 26 | 13 | 32 | 12 | 15 |
| SE-11 (Inv.) | | 0.35 | 15 | 22 | 28 | 25 | 13 | 32 | 12 | 15 |

As shown in Table 5, the compounds of this invention are particularly suitable for stabilization of the neutral tone patch without image degradation of the bichrome red or blue patches.

Example 6

Prints were prepared from Donor Elements YDE-1, MDE-3 or MDE-4, and CDE-2 as described in Table 6. Print speed was 1.007 msec/line and a resistive head voltage of 25.0 V. The printed images were subjected to High-Intensity Daylight fading for 28 days at 50 Klux, 5400° K light using a Xenon light source, at 32° C. and approximately 25% RH, after which the Status A densities were read. The percent density loss after fade was calculated from a step with an initial density of approximately 1.0. The results of the simulated daylight fade testing are as follows:

TABLE 6

| Stabilizer | Donor Element | Laydown Mole ratio Stabilizers to magenta dyes | Magenta G | Bichrome Red | | Bichrome Blue | | Neutral | | |
|---|---|---|---|---|---|---|---|---|---|---|
| | | | | GofR | BofR | RofB | GofB | RofN | GofN | BofN |
| None (control) | MDE-3 | none | 15 | 21 | 28 | 28 | 14 | 34 | 14 | 16 |
| AO control | MDE-4 | 0.75 | 16 | 21 | 27 | 30 | 14 | 34 | 14 | 14 |
| AO (control) | | 0.35 | 15 | 20 | 27 | 29 | 15 | 36 | 15 | 16 |
| SE-12 (Inv.) | MDE-4 | 0.75 | 16 | 21 | 27 | 28 | 13 | 32 | 12 | 14 |
| SE-12 (Inv.) | | 0.35 | 15 | 21 | 28 | 28 | 13 | 34 | 14 | 16 |
| SE-13 (Inv.) | MDE-4 | 0.75 | 16 | 23 | 29 | 29 | 15 | 34 | 15 | 16 |
| SE-13 (Inv.) | | 0.35 | 16 | 23 | 28 | 28 | 14 | 35 | 14 | 16 |
| SE-14 (Inv.) | MDE-4 | 0.75 | 14 | 21 | 24 | 24 | 10 | 29 | 9 | 12 |
| SE-14 (Inv.) | | 0.35 | 15 | 21 | 27 | 27 | 12 | 32 | 12 | 14 |
| SE-15 (Inv.) | MDE-4 | 0.75 | 24 | 28 | 32 | 33 | 16 | 37 | 15 | 17 |
| SE-15 (Inv.) | | 0.35 | 20 | 25 | 29 | 29 | 14 | 35 | 14 | 16 |
| SE-16 (Inv.) | MDE-4 | 0.75 | 20 | 27 | 32 | 33 | 16 | 38 | 16 | 17 |
| SE-16 (Inv.) | | 0.35 | 20 | 25 | 30 | 29 | 15 | 35 | 14 | 16 |

As shown in Table 6, the compounds of this invention are particularly suitable for stabilization of the neutral tone patch without image degradation of the bichrome red or blue patches. An especially preferred compound is SE-14 (cLogP>10) which shows improved stability in the red bichrome, blue bichrome and the neutral tone patches.

The invention has been described in detail with particular reference to certain preferred embodiments thereof, but it will be understood that variations and modifications can be effected within the spirit and scope of the invention.

The invention claimed is:

1. A thermal donor comprising a dye mixture and a urea light-stabilizing compound for stabilizing at least one dye, wherein said urea light-stabilizing compound is represented by the following structure I:

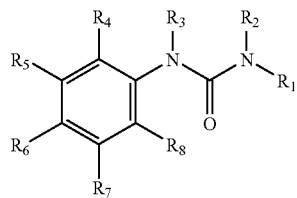

wherein:
$R_1$, $R_2$ and $R_3$ independently represent a hydrogen atom, alkyl group, cycloalkyl group, alkenyl group, aralkyl group, aryl group or heterocyclic group, provided that at least one of $R_1$, $R_2$, and/or $R_3$ is a hydrogen atom and wherein $R_3$ may form a heterocyclic ring with either $R_4$ or $R_8$;

$R_4$-$R_8$ independently represent a hydrogen atom, hydroxyl group, alkyl group, cycloalkyl group, alkenyl group, aralkyl group, aryl group, heterocyclic group, aryloxy group, or alkoxy group; and wherein at least one of $R_4$-$R_8$ is an alkoxy group.

2. The thermal donor of claim 1 wherein two adjacent $R_4$-$R_8$ groups join together to form a carbocyclic or heterocyclic ring.

3. The thermal donor of claim 1 wherein said at least one urea light-stabilizing compound for stabilizing at least one dye is represented by the following structure SE-1:

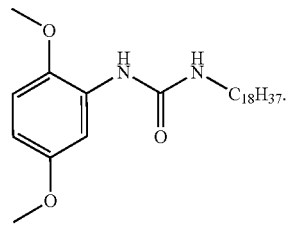

4. The thermal donor of claim 1 wherein said at least one urea light-stabilizing compound for stabilizing at least one dye is represented by the following structure SE-14:

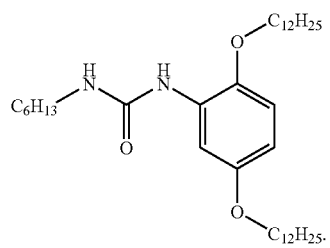

5. The thermal donor of claim 4 wherein said at least one urea light-stabilizing compound for stabilizing at least one dye improves stability in the red bichrome, blue bichrome and the neutral tones.

6. The thermal donor of claim 1 wherein said at least one urea light-stabilizing compound for stabilizing at least one dye is represented by at least one structure selected from the group consisting of:

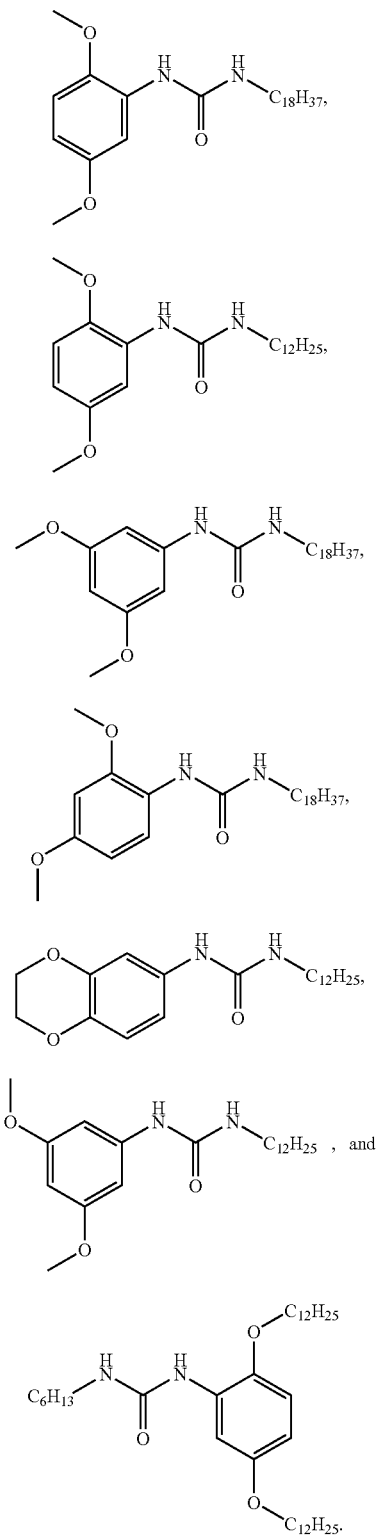

7. The thermal donor of claim 1 wherein said at least one urea light-stabilizing compound for stabilizing at least one dye has a molecular weight (MW) of less than 400.

8. The thermal donor of claim 1 wherein said at least one urea light-stabilizing compound for stabilizing at least one dye has a cLogP of greater than 5.

9. The thermal donor of claim 1 wherein said at least one urea light-stabilizing compound for stabilizing at least one dye is present in the amount of from 0.02 to 0.5 grams/m² of said thermal donor.

10. The thermal donor of claim 1 wherein said at least one urea light-stabilizing compound for stabilizing at least one dye is present in molar concentrations of from 30% to 80% relative to the total dye molar concentration of said thermal donor.

11. The thermal donor of claim 1 wherein said thermal donor comprises one or more colored patch.

12. The thermal donor of claim 11 wherein said at least one urea light-stabilizing compound for stabilizing at least one dye is present in a dye-donor magenta patch.

13. The thermal donor of claim 1 wherein said dye comprises at least one dye selected from the group consisting of the following dye structures:

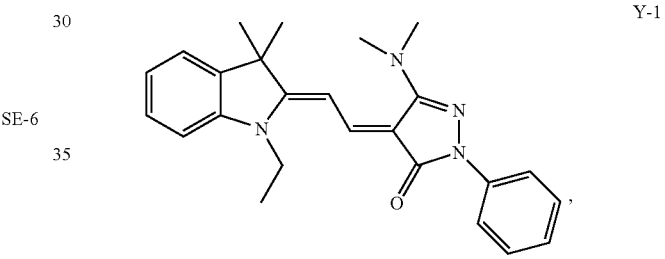

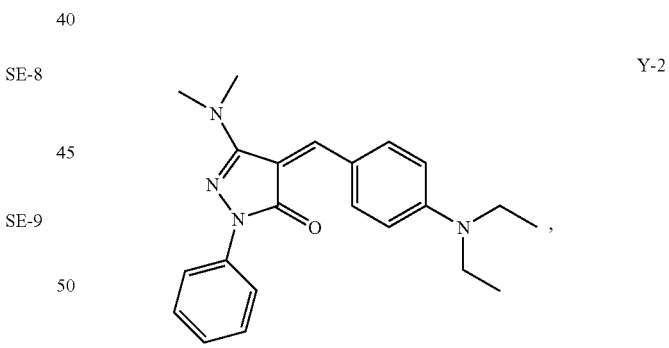

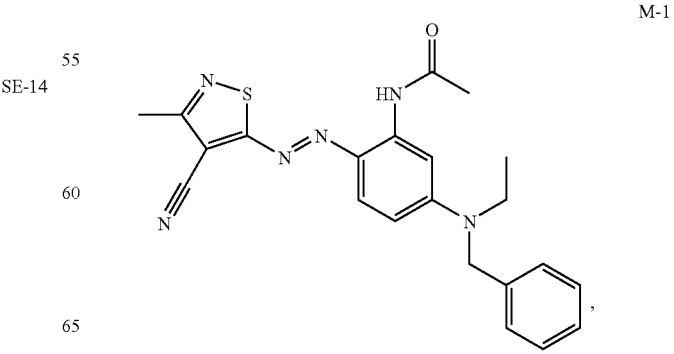

M-2
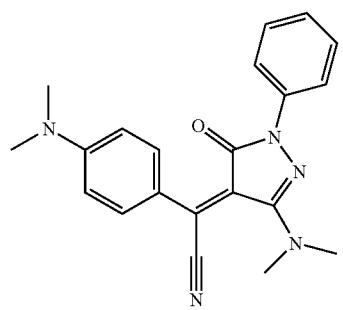
C-4
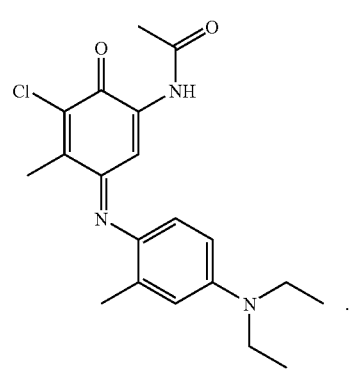
M-3
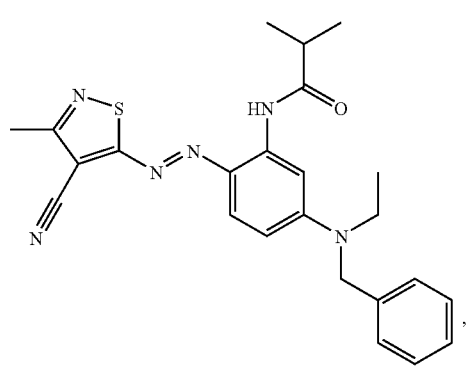
14. The thermal donor of claim 1 wherein said dye mixture comprises the following dye structures:
Y-1
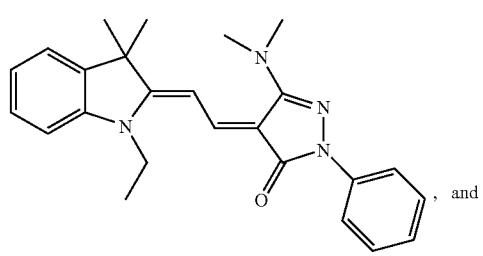
, and
M-4
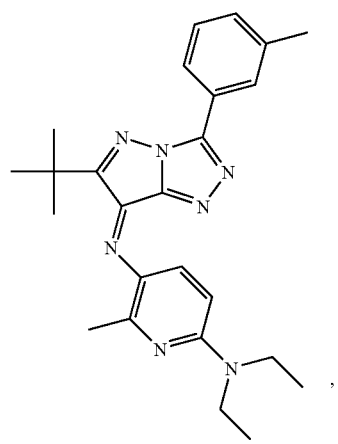
Y-2
15. The thermal donor of claim 1 wherein said dye mixture comprises the following dye structures:
M-5
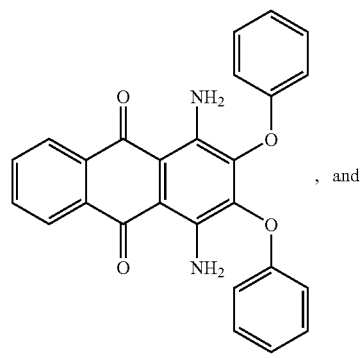
, and
M-1
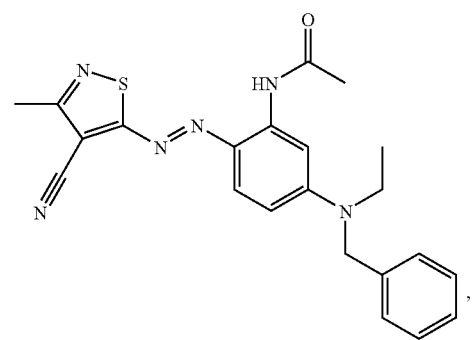
, -continued
M-2
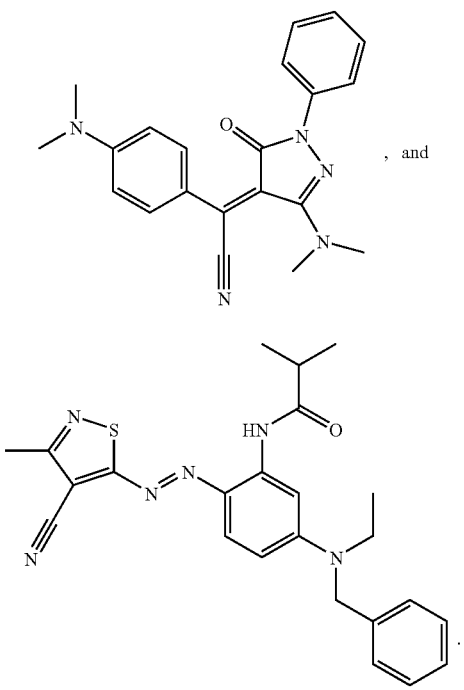
, and
M-3
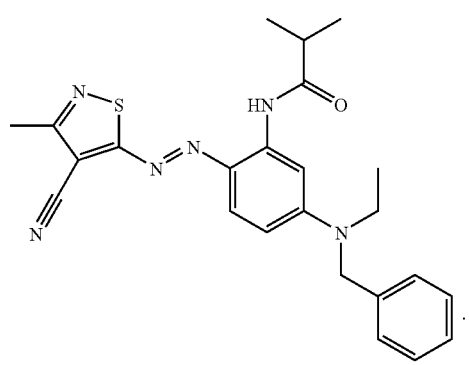
16. The thermal donor of claim 1 wherein said dye mixture comprises the following dye structures:
M-4
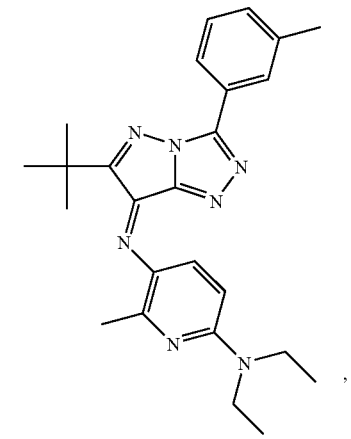
,
M-5
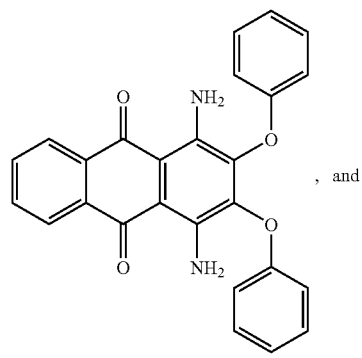
, and
-continued
M-2
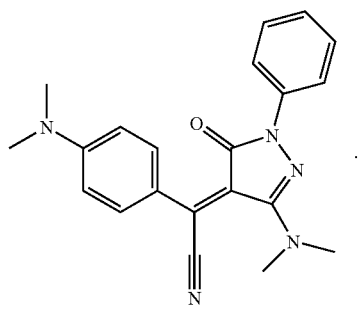
.
17. The thermal donor of claim 1 wherein said dye mixture comprises the following dye structures:
C-1
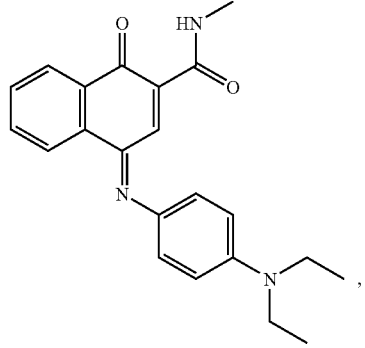
,
C-2
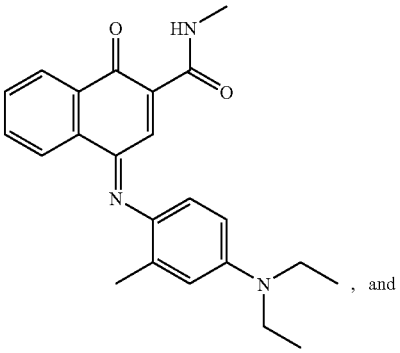
, and
C-3
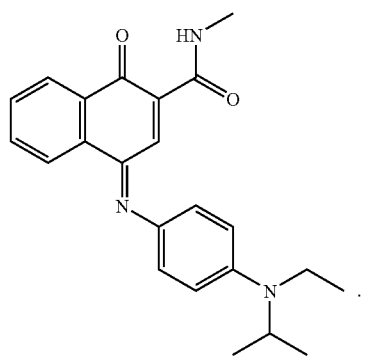
.
18. The thermal donor of claim 1 further comprising a polymeric binder of ethyl cellulose.

19. The thermal donor of claim 1 wherein said stabilizing at least one dye is light stabilization of at least one yellow dye in a neutral tone patch.

20. The thermal donor of claim 1 wherein said thermal donor is a dye diffusion thermal donor.

21. The thermal donor of claim 1 wherein said thermal donor is a sublimation transfer thermal donor.

22. An imaging system comprising a donor sheet having a layer containing a dye on a support and an image receiving sheet having a dye receiving layer on a substrate, wherein at least one of said donor sheet or said image receiving sheet comprises a dye mixture and a urea light-stabilizing compound for stabilizing at least one dye, wherein said urea light-stabilizing compound is represented by the following structure I:

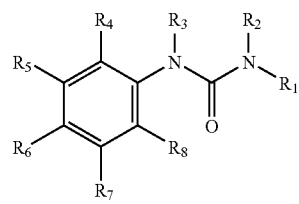

wherein:

$R_1$, $R_2$ and $R_3$ independently represent a hydrogen atom, alkyl group, cycloalkyl group, alkenyl group, aralkyl group, aryl group or heterocyclic group, provided that at least one of $R_1$, $R_2$, and/or $R_3$ is a hydrogen atom and wherein $R_3$ may form a heterocyclic ring with either $R_4$ or $R_8$;

$R_4$-$R_8$ independently represent a hydrogen atom, hydroxyl group, alkyl group, cycloalkyl group, alkenyl group, aralkyl group, aryl group, heterocyclic group, aryloxy group, or alkoxy group;

wherein at least one of $R_4$-$R_8$ is an alkoxy group; and wherein said imaging system is a dye thermal system used to prepare prints from electronic images.

23. The imaging system of claim 22 wherein said at least one urea light-stabilizing compound for stabilizing at least one dye is represented by the following structure SE-1:

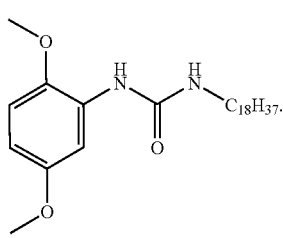

SE-1

24. The imaging system of claim 22 wherein said at least one urea light-stabilizing compound for stabilizing at least one dye is represented by the following structure SE-14:

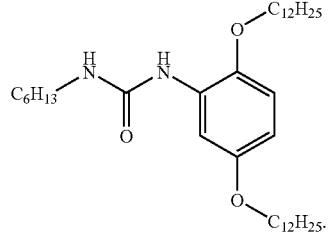

SE-14

25. The imaging system of claim 22 wherein said at least one urea light-stabilizing compound for stabilizing at least one dye is represented by at least one structure selected from the group consisting of:

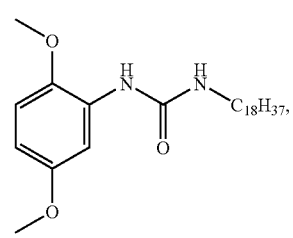

SE-1

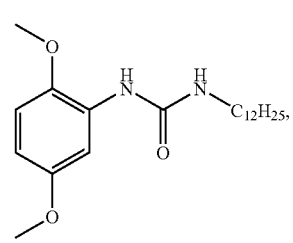

SE-3

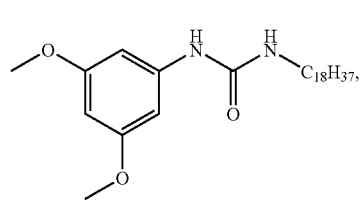

SE-4

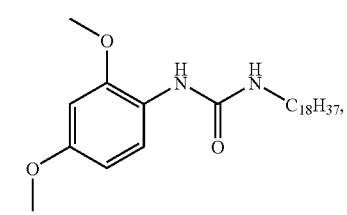

SE-6

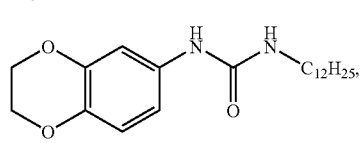

SE-8

-continued

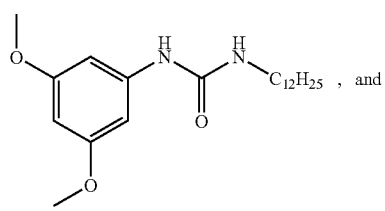
SE-9

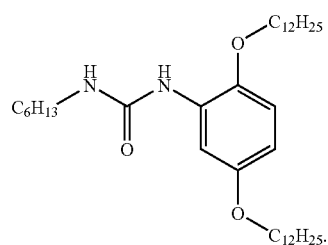
SE-14

26. The imaging system of claim 22 wherein said at least one urea light-stabilizing compound for stabilizing at least one dye has a molecular weight (MW) of less than 400.

27. The imaging system of claim 22 wherein said at least one urea light-stabilizing compound for stabilizing at least one dye has a cLogP of greater than 5.

28. The thermal donor of claim 1 wherein $R_3$ is a hydrogen atom.

29. The thermal donor of claim 28 wherein at least one of $R_1$ and $R_2$ is not a hydrogen atom.

30. The thermal donor of claim 1 wherein at least one of $R_1$ and $R_2$ is not a hydrogen atom.

* * * * *

UNITED STATES PATENT AND TRADEMARK OFFICE
CERTIFICATE OF CORRECTION

PATENT NO. : 7,312,012 B1
APPLICATION NO. : 11/610582
DATED : December 25, 2007
INVENTOR(S) : Donald R. Diehl et al.

Page 1 of 1

It is certified that error appears in the above-identified patent and that said Letters Patent is hereby corrected as shown below:

Column 39, Line 20        In Claim 22, after

" 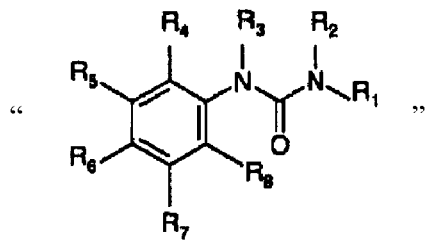 "

insert -- (I) --

Signed and Sealed this

Sixth Day of May, 2008

JON W. DUDAS
*Director of the United States Patent and Trademark Office*